3,143,354
SEAL FOR SWIVELLED NOZZLE
Philip P. Newcomb, Manchester, and Robert E. Coburn, Warehouse Point, Conn., assignors to United Aircraft Corporation, East Hartford, Conn., a corporation of Delaware
Filed May 16, 1961, Ser. No. 110,444
4 Claims. (Cl. 277—75)

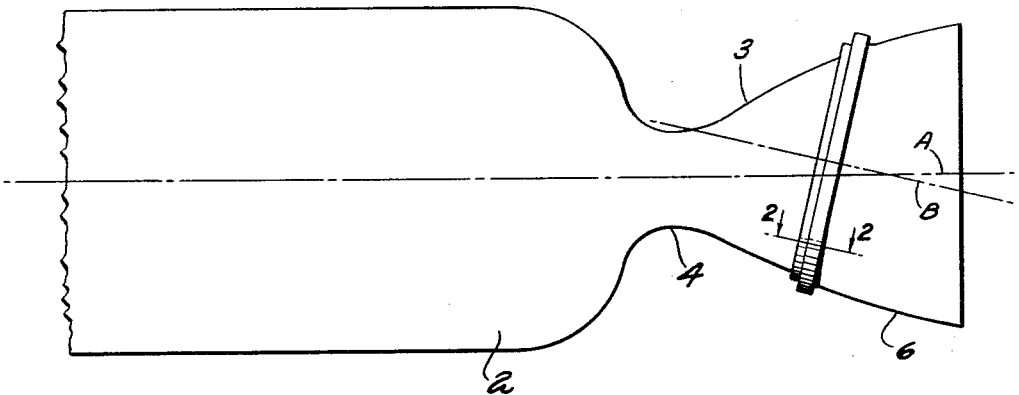
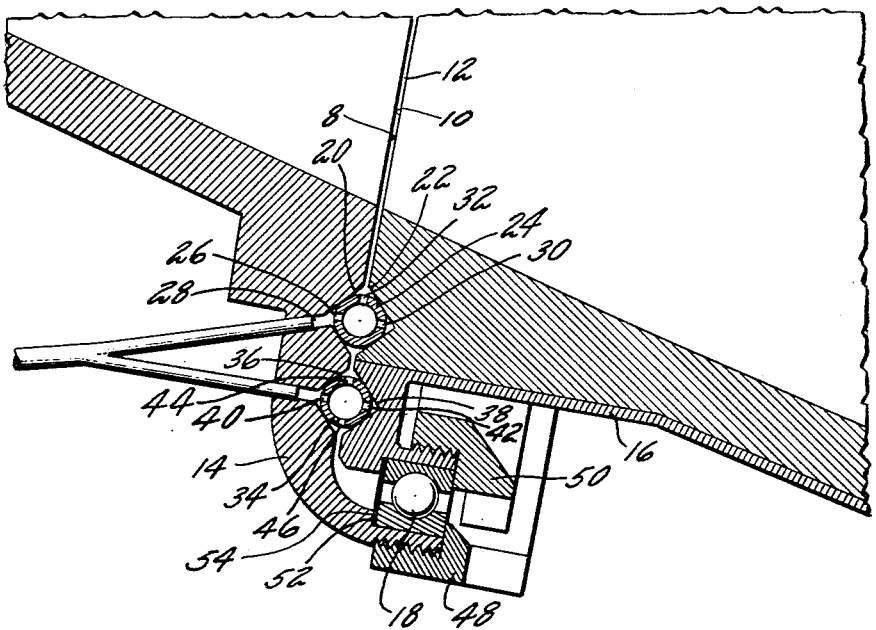

This invention relates to a lubricant seal assembly and more particularly to a seal arrangement by which to seal a swivelled rocket nozzle thereby minimizing leakage.

One feature of the invention is a seal passage in the joint between the fixed and movable portions of the nozzle to prevent leakage of the case of the nozzle through the joint without preventing swivelling of a nozzle. Another feature is the introduction of a lubricant in the seal for pressurizing and in some cases cooling the seal. Another feature is the arrangement of the seal in such a manner that lubricants delivered to the seal escape into the joint and any excess will flow into the nozzle to prevent the collection within the joint of particles carried by the gas passing through the nozzle.

Other features and advantages will be apparent from the specification and claims and from the drawing which illustrates an embodiment of the invention.

FIG. 1 is a side view of the nozzle.

FIG. 2 is an enlarged sectional view showing the joint in detail.

The nozzle is a conventional convergent-divergent nozzle used on a rocket 2 and has a fixed portion 3 which includes the throat 4 of the nozzle and a movable portion 6 which includes a discharge end thereof. The fixed and movable portions have opposed adjacent surfaces 8 and 10 closely spaced to define therebetween a narrow clearance space 12.

The fixed and movable portions of the nozzle are supported for rotation with respect to one another and for this purpose the fixed portion 3 has a seal ring 14 and the movable portion carries a cooperating ring 16. These rings have therebetween bearing elements 18 which are shown as ball bearing elements the axis B of which is at right angles to the plane defined by the narrow space between the fixed and movable portions of the nozzle. It will be apparent that the nozzle has a longitudinal axis A and that the narrow space 12 and bearing 18 have an axis B which is placed at an acute angle to the nozzle axis. The bearing and space 12 define the axis about which the movable portion of the nozzle rotates so that by turning the movable portion of the nozzle through a predetermined angle, the angle of discharge of the propulsive fluid from the nozzle may be changed from a normal discharge which would be parallel to the longitudinal axis of the nozzle.

As best shown in FIG. 2, the opposed surfaces 8 and 10 have circumferentially extending grooves 20 and 22 therein to form a recess that receives a seal ring 24. Each groove 20 or 22 is in the form of a two-sided groove, the surfaces of which are 90° to each other so that the opposed grooves together form an annular space which is substantially square in cross section.

The sealing ring 24 has a plurality of openings 26 therein to receive lubricant delivered to the ring through a passage 28 formed in the fixed portion 3 and communicating as shown with the base of the groove 20. With this arrangement lubricants under pressure from the passage 28 will fill the groove 20 and discharge into the hollow tube forming the seal 24. The ring 24 also has passages 30 for the escape of lubricants into the groove 22 thereby lubricating the outer surface of the seal and the groove so that relative rotation between the fixed and movable portions of the nozzles will not be impeded.

The seal 24 may also have a plurality of openings 32 directed radially inward in alignment with the space 12 so that lubricants will fill the space 12 inwardly of the seal ring to prevent particles carried by the propulsive fluid from collecting in the space 10.

Although one seal ring 24 may be adequate in any installations it may be desirable to provide a second seal ring 34 of similar construction located in opposed grooves 36 and 38 and having passages 40, 42 and 44 therein in the same arrangement as the openings 26, 30 and 32, respectively, of the seal ring 24. In addition, the ring 34 may have a number of outwardly directed openings 46 for the delivery of lubricants to the bearing elements 18.

The bearing elements 18 may be held in position in the respective rings 14 and 16 by clamping rings 48 and 50. With this arrangement, it is possible by positioning one or more shims 52 between the bearing elements 18 and a cooperating shoulder 54 on the ring 14 to adjust the dimension of the space 10 and thereby control the pressure exerted on the seal rings 24 and 34. In this way the quantity of lubricants utilized may be controlled and the torque required to turn the movable portions of the nozzle may be adjusted by adjusting the pressure between the seal ring and the groove receiving the rings.

It is to be understood that the invention is not limited to the specific embodiment herein illustrated and described, but may be used in other ways without departure from its spirit as defined by the following claims.

We claim:

1. In a swivelled nozzle having a fixed nozzle portion and a movable nozzle portion cooperating to form an exhaust gas passage and being in juxtaposition with a narrow space therebetween, and bearing means externally of said nozzle for supporting the movable nozzle portion for rotation about the axis of the bearings, the improvement of a seal in said narrow space comprising a groove in at least one of said portions, a hollow ring in said groove having first, second and third perforations selectively positioned so that pressurized lubricant introduced to said ring enters the interior of said ring through said first perforation to cause said ring to bear against said groove, and so that lubricant from the interior of said ring passes through said second perforation into said groove to lubricate between said ring and said groove, and so that lubricant from the interior of said ring passes through said third perforation into said narrow space adjacent said gas passage.

2. Apparatus according to claim 1 wherein said groove comprises a two-sided groove in each of said portions with the two sides of each groove in each portion forming right angles and so that the grooves cooperate to form an annular space which is substantially square in cross section.

3. Apparatus as in claim 2 wherein said first ring perforation communicates with said groove right angle of said first portion and wherein said second ring perforation communicates with the groove angle of said second portion.

4. In a swivelled nozzle having a fixed nozzle portion and a movable nozzle portion cooperating to form an exhaust gas passage and being in juxtaposition with a narrow space therebetween, and bearing means externally of said nozzle for supporting the movable nozzle portion for rotation about the axis of the bearings, the improvement of a seal in said narrow space comprising a groove in at least one of said portions, a hollow ring in said groove having selectively positioned perforations so that pressurized lubricant introduced to the interior of said ring passes through said perforations into said narrow space adjacent said gas passage to prevent products of combustion from said gas passage entering said narrow space.

References Cited in the file of this patent

UNITED STATES PATENTS

| | | |
|---|---|---|
| 735,260 | Huhn | Aug. 4, 1903 |
| 2,832,618 | Knoll et al. | Apr. 29, 1958 |
| 2,867,482 | Schmidt | Jan. 6, 1959 |
| 2,933,891 | Britt | Apr. 26, 1960 |

FOREIGN PATENTS

| | | |
|---|---|---|
| 554,331 | Great Britain | June 29, 1943 |
| 1,087,909 | Germany | Aug. 25, 1960 |